United States Patent Office 3,424,841
Patented Jan. 28, 1969

3,424,841
METHOD OF INHIBITING BACTERIA WITH GERMICIDAL TROPOLONE POLYMER COMPOSITIONS
Lorraine Guy Donaruma, Potsdam, N.Y., assignor to Research Corporation, New York, N.Y., a non-profit corporation of New York
No Drawing. Continuation-in-part of aplication Ser. No. 476,743, Aug. 2, 1965. This application Jan. 28, 1966, Ser. No. 523,581
U.S. Cl. 424—82       1 Claim
Int. Cl. A61l *13/00*

ABSTRACT OF THE DISCLOSURE

Tropolone-formaldehyde condensation polymers exhibit antibacterial activity.

---

This application is a continuation-in-part of my copending application Ser. No. 476,743, filed Aug. 2, 1965, now abandoned, and relates to germicidal tropolone compositions. In one specific aspect, it relates to germicidal tropolone polymer compositions and to methods for using such germicidal compositions.

The seven-membered ring compound 2,4,6-cycloheptatrien-2-ol-1-one, better known as tropolone, is representative of a class of compounds known as the tropolones. These compounds exhibit quasi-aromatic activity and undergo nuclear substitution in a manner somewhat analogous to phenol. Thus, the tropolone nucleus can be chlorinated, brominated, nitrated, sulfonated, formylated, nitrosated and diazo-coupled, usually in the gamma or 5-position. Conventional conversions yield the corresponding iodo, amino, hydrazino, acylamino, mercapto, hydroxy, alkoxy, cyano and caboxylic acid derivatives. Tropolone, and substituted tropolone compounds such as those described, can be reacted with formaldehyde to produce polymeric compositions.

The present invention is the method of inhibiting the growth of bacteria which comprises contacting the same with a tropolone-formaldehyde condensation polymer in an amount toxic to said bacteria.

The condensation polymers for use in the process of the present invention are made by reacting tropolone or a substituted tropolone as described above with formaldehyde. Preferably, the formaldehyde, as the commercially available 37% formalin solution, is added to approximately equal molar quantities of the tropolone reactant dissolved in water containing a strongly alkaline catalyst such as an alkali metal hydroxide dissolved therein. The reaction mixture is heated, usually at its reflux temperature, for a period of time ranging from several hours up to one day. Acidification of the cooled reaction mixture, usually with a mineral acid, results in the precipitation of the tropolone-formaldehyde product.

The tropolone-formaldehyde polymer is most conveniently purified by solution in a solvent therefor, and separation from any undissolved materials. The purified polymer is reprecipitated by mixing its solution with a nonsolvent for the polymer miscible with the first solvent. Superior results are obtained when the first solvent is dimethylformamide and the polymer nonsolvent is an aqueous saline solution. The polymers have inherent viscosities in the range 0.06–0.14 at 25° C. as measured in dimethylformamide. By comparison with analogous polymers in the benzene system, compositions prepared as described above appear to have molecular weights in the range 4500–7000.

My invention is further illustrated by means of the following examples describing the preparation of polymeric compositions for use in the process of the present invention.

Example 1

Ten grams (0.083 mole) of tropolone was added to 200 milliliters of 20% aqueous sodium hydroxide solution. The reaction mixture was heated and upon initial refluxing an equimolar amount (6.5 milliliters) of a 37% formaldehyde solution was added. The reaction was refluxed for ten hours, cooled, and then made slightly acidic with 6 N hydrochloric acid. The tropolone-formaldehyde polymer precipitated out on acidification as a pale yellow solid.

Example 2

5-p-tolylazotropolone (1.2 grams or 0.005 mole) was added to 100 milliliters of a 5% sodium hydroxide solution. To the refluxing reaction mixture, an equimolar amount (0.5 milliliter) of a 37% formaldehyde solution was added. The reaction was refluxed for 24 hours, cooled, and acidified. A fine precipitate formed which was filtered, washed with several portions of cold water, and dried. The 0.6 gram of dry solid was dissolved in dimethylformamide, the solution filtered to remove any undissolved solid, and the polymer reprecipitated by addition of the solution to a 15% aqueous sodium chloride solution. The reprecipitated solid was extracted for 24 hours with water to remove any remaining soluble salts. The resultant 5-p-tolylazotropolone-formaldehyde polymer was heat stable up to 250° C.

*Analysis.*—Found: C, 64.35; H, 5.64. Infrared data (cm.$^{-1}$): 740 w., 825 w., 865 w., 1365 s., 1425 s., 1510 s., 1520 s., 1600 s., 3400 m., wherein s.=strong absorbance, m.=medium absorbance, and w.=weak absorbance.

Example 3

Six grams (0.04 mole) of 5-nitrosotropolone was dissolved in 200 milliliters of a 5% sodium hydroxide solution. An equimolar amount (3.3 milliliters) of a 37% formaldehyde solution was added to the refluxing reaction mixture and the reaction mixture refluxed for an additional 8 hours. The reaction mixture was made slightly acidic with 6 N hydrochloric acid causing a fine brown precipitate to form which was filtered off, washed several times with small portions of water, and dried. The 1.8 grams of dry solid product was dissolved in dimethyl-formamide, the solution filtered to remove any undissolved solid, and the polymer precipitated by addition of the solution to a 15% aqueous sodium chloride solution. The solid was filtered out and extracted for 24 hours with water. The 5-nitrosotropolone-formaldehyde polymer was heat stable up to 250° C.

*Analysis.*—Found: C, 56.65; H, 4.82. Infrared data (cm.$^{-1}$): 700 w., 785 w., 838 w., 875 w., 1030 w., 1230 s., 1290 s., 1350 w., 1430 s., 1500 s., 1630 s., 1680 s., 3000 s.

Example 4

One-half gram of 5-aminotropolone (0.004 mole) was dissolved in 25 milliliters of a 20% sodium hydroxide solution and refluxed for 4 hours after the addition of an equimolar amount (0.4 milliliter) of a 37% formaldehyde solution. After cooling the solution, it was diluted to 200 milliliters with water and carefully neutralized with 6 N hydrochloric acid to pH 7. A fine yellow-brown precipitate was filtered off, washed several times with water, and dried. The 0.4 gram of dry product was dissolved in dimethylformamide, the solution filtered to remove any undissolved solid, and the polymer reprecipitated by adding the solution to a 15% aqueous sodium chloride solution. The polymer was extracted for 24 hours with water. The 5-aminotropolone-formaldehyde polymer was heat stable up to 250° C.

*Analysis.*—Found: C, 59.56; H, 5.09. Infrared data (cm.$^{-1}$): 710 m., 750 m., 790 s., 855 m., 1100 w., 1150 w., 1235 m., 1290 s., 1350 w., 1450 s., 1520 w., 1550 w., 1650 s., 3175 m., 3320 m.

Example 5

Eight-tenths gram (0.005 mole) of hinokitol (4-isopropyltropolone) was dissolved in 50 milliliters of a 15% sodium hydroxide solution. The reaction was refluxed for eight hours after the addition of an equimolar amount (0.5 milliliter) of a 37% formaldehyde solution. Upon acidification with 6 N hydrochloric acid, 0.6 gram of a white precipitate formed which was filtered off and washed several times with water. The polymer was dissolved in dimethylformamide, the solution filtered to remove any undissolved solid, and the polymer reprecipitated by addition of the solution to a 15% aqueous sodium chloride solution. The reprecipitated polymer was extracted with water for 24 hours. The hinokitol-formaldehyde polymer darkened at 160° C. but no further physical changes occurred up to 250° C.

*Analysis.*—Found: C, 68.94; H, 6.82. Infrared data (cm.$^{-1}$): 760 m., 800 w., 830 m., 890 w., 910 w., 930 w., 970 m., 1200 w., 1250 s., 1310 w., 1395 s., 1440 s., 1530 s., 1610 s., 2850 m., 3250 m.

It has been established by testing representative tropolene-formaldehyde condensation polymers against various test organisms that such compositions exhibit antibacterial activity. It will be appreciated that these compositions will differ in their antimicrobial effects and degree of activity with respect to various microorganisms. The concentrations required for toxicity of fungi and bacteria are very small, the exact amount depending on the nature of the polymeric composition employed and the microorganism being controlled. Tropolone-formaldehyde polymeric condensates may be employed as bacteriostats in solution or formulated as emulsions and may be utilized as the active ingredient in various solid or liquid sanitizing compositions for use as germicidal compositions.

In the following experiments, the indicated polymeric compositions were tested against representative microorganisms by the agar plate method described in U.S.D.A. Circular No. 198 (1931). In each case the width of the zone of inhibition was measured. In the table below, the results of tests giving zones of inhibition below 10 millimeters are classified as weak, and those between 10 and 20 millimeters are classified as strong.

| Test culture | Hinokitol-formaldehyde | 5-p-tolylazo-tropolone-formaldehyde |
| --- | --- | --- |
| *Staphylococcus aureus* | Strong | Weak. |
| *Salmonella typhosa* | do | Do. |
| *Salmonella choleraesuis* | do | |
| *Escherichia coli* | Weak | |
| *Streptococcus pyogenes* | Strong | Do. |

I claim:
1. A method of inhibiting the growth of Staphylococcus, Salmonella, Escherichia and Streptococcus bacteria which comprises contacting the bacteria with a tropolone-formaldehyde condensation polymer composition in an amount toxic to the bacteria, said composition being made by heating at temperatures up to the reflux temperature an aqueous solution of tropolone, hinokitol, aminotropolone, nitrosotropolone or p-tolylazotropolone with approximately equimolar quantities of formaldehyde in the presence of alkali metal hydroxide.

References Cited

UNITED STATES PATENTS

| 2,191,802 | 2/1940 | Novotny et al. | 260—64 |
| 2,380,351 | 7/1945 | Williams et al. | 167—26 |
| 2,894,989 | 7/1959 | Pratt et al. | 167—30 |

FOREIGN PATENTS

| 10,348 | 9/1902 | Great Britain. |

OTHER REFERENCES

Nozoe et al.: Chemical Abstracts, 1952, pp. 7561–7562.

Nozoe et al.: Chemical Abstracts, 1954, p. 3946.

ALBERT T. MEYERS, *Primary Examiner.*

D. R. MAHANAND, *Assistant Examiner.*